(12) United States Patent
Jahn et al.

(10) Patent No.: US 11,067,960 B2
(45) Date of Patent: *Jul. 20, 2021

(54) METHOD AND ARRANGEMENT FOR MONITORING THE STATUS OF A PRODUCTION DEVICE

(71) Applicant: Siemens Aktiengesellschaft, Munich (DE)

(72) Inventors: Lars Jahn, Moehrendorf (DE); Thomas Menzel, Langensendelbach OT Braeuningshof (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 45 days.

This patent is subject to a terminal disclaimer.

(21) Appl. No.: 16/141,466

(22) Filed: Sep. 25, 2018

(65) Prior Publication Data

US 2019/0101886 A1 Apr. 4, 2019

(30) Foreign Application Priority Data

Sep. 29, 2017 (EP) .................................. 17194086

(51) Int. Cl.
*G08B 21/00* (2006.01)
*G05B 19/05* (2006.01)
*G05B 19/418* (2006.01)

(52) U.S. Cl.
CPC ....... *G05B 19/058* (2013.01); *G05B 19/4183* (2013.01); *G05B 19/4185* (2013.01);
(Continued)

(58) Field of Classification Search
CPC .............. G05B 19/058; G05B 19/4183; G05B 19/4185; G05B 19/41855;
(Continued)

(56) References Cited

U.S. PATENT DOCUMENTS 8,493,186 B2 * 7/2013 Sugano .............. G06K 7/10435
340/10.2
9,460,327 B2 * 10/2016 Kamiya .................. G01S 13/58
(Continued)

FOREIGN PATENT DOCUMENTS

CA 2326301 10/2001
CN 1426546 6/2003
(Continued)

OTHER PUBLICATIONS

EP Search Report based dated Apr. 3, 2018.
(Continued)

*Primary Examiner* — Zhen Y Wu
(74) *Attorney, Agent, or Firm* — Cozen O'Connor

(57) ABSTRACT

Method and an arrangement for monitoring status of a production device configured to implement an industrial process or industrial production with a control device with sensors and actuators, where at least one further sensor is carried through the production device with a product being processed by the production device, where further signals are wirelessly transmitted to a status-monitoring device by the further sensor, and where the signals and/or status information items and the further signals are placeable in relationship with one another to generate status information item about the production device such that it is possible to plan the status monitoring separately from the production device, and possible to combine information items of the industrial control device with the information items and data of a mobile sensor (further sensor) that passes through the production device, such that more precise status information items about the production device status can be acquired.

18 Claims, 2 Drawing Sheets

(52) U.S. Cl.
CPC . *G05B 19/41855* (2013.01); *G05B 19/41865* (2013.01); *G05B 2219/1133* (2013.01); *G05B 2219/14006* (2013.01); *G05B 2219/15117* (2013.01); *G05B 2219/31095* (2013.01); *G05B 2219/31286* (2013.01); *G05B 2219/31304* (2013.01); *G05B 2219/32234* (2013.01); *G05B 2219/33192* (2013.01); *G05B 2219/36133* (2013.01)

(58) Field of Classification Search
CPC ...... G05B 19/41865; G05B 2219/1133; G05B 2219/14006; G05B 2219/15117; G05B 2219/31095; G05B 2219/31286; G05B 2219/31304; G05B 2219/32234; G05B 2219/33192; G05B 2219/36133
USPC .......................................................... 340/679
See application file for complete search history.

(56) References Cited

U.S. PATENT DOCUMENTS

| | | | | |
|---|---|---|---|---|
| 9,581,689 | B2* | 2/2017 | Ando | G06K 17/0022 |
| 9,696,179 | B2* | 7/2017 | Hubauer | G05B 19/4183 |
| 9,740,896 | B1* | 8/2017 | Ben-Bassat | G06K 7/10366 |
| 9,798,304 | B2* | 10/2017 | Fan | C12M 41/36 |
| 2003/0102367 | A1 | 6/2003 | Monette et al. | |
| 2007/0055470 | A1* | 3/2007 | Pietrzyk | H04B 5/00 702/104 |
| 2007/0090178 | A1* | 4/2007 | Fujii | G05B 23/0272 235/375 |
| 2007/0090953 | A1 | 4/2007 | Park et al. | |
| 2008/0004740 | A1* | 1/2008 | Tamarkin | G06Q 10/06 700/106 |
| 2008/0042830 | A1* | 2/2008 | Chakraborty | G06K 7/0008 340/540 |
| 2011/0239071 | A1* | 9/2011 | Sugano | G06K 7/10009 714/746 |
| 2012/0075080 | A1* | 3/2012 | Ohuchi | G06K 7/0008 340/10.51 |
| 2012/0146774 | A1* | 6/2012 | Kasai | G06K 7/0008 340/10.42 |
| 2013/0009751 | A1* | 1/2013 | Sato | H04W 4/06 340/10.1 |
| 2013/0060725 | A1* | 3/2013 | Sugano | G06K 7/10425 706/46 |
| 2013/0141222 | A1* | 6/2013 | Garcia | G06K 7/01 340/10.51 |
| 2013/0169417 | A1* | 7/2013 | Sugano | G06K 7/01 340/10.1 |
| 2013/0211559 | A1* | 8/2013 | Lawson | G06F 21/64 700/83 |
| 2013/0211764 | A1* | 8/2013 | Steiner | G01P 15/123 702/96 |
| 2013/0314212 | A1* | 11/2013 | Hinman | G01S 5/04 340/10.1 |
| 2014/0022093 | A1* | 1/2014 | Hubauer | G01D 4/00 340/870.02 |
| 2014/0139324 | A1* | 5/2014 | Sano | G06K 7/10009 340/10.51 |
| 2014/0167920 | A1* | 6/2014 | Kamiya | G01S 13/76 340/10.1 |
| 2015/0304611 | A1* | 10/2015 | Nakase | G06K 7/10415 348/143 |
| 2015/0316910 | A1* | 11/2015 | Kalan | G05B 19/4185 700/11 |
| 2015/0316922 | A1* | 11/2015 | Rischar | H04L 12/1859 700/23 |
| 2016/0125211 | A1* | 5/2016 | Hattori | G06K 7/10366 340/10.1 |
| 2016/0364682 | A1* | 12/2016 | Jones | G06Q 10/087 |
| 2017/0032316 | A1* | 2/2017 | Benedict | G06Q 10/0833 |
| 2018/0052452 | A1* | 2/2018 | Kimura | G05B 19/048 |
| 2018/0053124 | A1* | 2/2018 | Kimura | G05B 19/4183 |
| 2018/0088564 | A1* | 3/2018 | Billi-Duran | G05B 19/41865 |
| 2018/0088567 | A1* | 3/2018 | Li | G05B 19/41885 |
| 2018/0150061 | A1* | 5/2018 | Yang | G05B 19/0423 |
| 2019/0030582 | A1* | 1/2019 | Olsson | B23K 15/0046 |
| 2019/0101886 | A1* | 4/2019 | Jahn | G05B 19/41865 |
| 2020/0166917 | A1* | 5/2020 | Wilber | G05B 19/41875 |

FOREIGN PATENT DOCUMENTS

| | | |
|---|---|---|
| CN | 203368765 U | 12/2013 |
| CN | 206095189 U | 4/2017 |
| CN | 211553257 U | 9/2020 |
| WO | WO 2012/136526 | 10/2012 |
| WO | WO 2017/198327 | 11/2017 |

OTHER PUBLICATIONS

Mogens Mathiesen et al., Wireless Ad-Hoc Networks for Industrial Automation: Current Trends and Future Prospects, Proceedings of the 17$^{th}$ World Congress the International Federation of Automatic Control; Seoul, Korea; Jul. 6-11, 2008 vol. 38, No. 1, pp. 89-100, XP055464272, Red Hock, NY ISSN: 1474-6670, DOI: 10.3182/20050703-6-CZ 1902.01170, ISBN: 978-1-123-47890-7, section 1.2, 3.2, 3.5, 4.2 and 4.3; abstract; 2005.

Pouria Zand et al., Wireless Industrial Monitoring and Control Networks: The Journey So Far and the Road Ahead, Journal of Sensor and Actuator Networks, vol. 1, No. 2, pp. 123-152, XP055464275, DOI: 10.3390/jsan1020123, the whole document; 2012.

Office Action dated Jan. 26, 2021 issued in Chinese Patent Application No. 201811136477.7.

Office Action dated Nov. 26, 2020 issued in European Patent Application No. 17194086.9.

* cited by examiner

METHOD AND ARRANGEMENT FOR MONITORING THE STATUS OF A PRODUCTION DEVICE

BACKGROUND OF THE INVENTION

1. Field of the Invention

The invention relates to a method for monitoring the status of a production device, and to an arrangement for monitoring the status of the production device.

2. Description of the Related Art

Production devices (production means) for implementing a fabrication process or production process or the like are generally used in industrial automation arrangements. Generally, the production devices comprise an industrial controller (control device) that is often also referred to as a programmable logic controller (PLC). Furthermore, sensors and actuators are generally a component of a production device, where these sensors and actuators are usually linked to the control devices via a field bus system or other communication means. Furthermore, the production devices also include all other production means, such as machines (e.g., machine tools), conveyor means, boilers, heaters, or compressors.

The abovementioned sensors primarily serve to generate measured values or generally input signals for the programmable logic controllers, as a result of which a control program is enabled to detect the status of a production device, of a product or of a chemical process and to actuate the abovementioned actuators in reaction to these status information items that are generated as a result, and furthermore to make available data for operator control and observation devices (referred to as HMI (Human-Machine Interface) devices). With respect to the production means, such as rotational speeds and torques of drives, temperatures of production means (e.g., motors), mechanical statuses and the like are detected with the sensors.

These sensors are also increasingly used to generate maintenance information items. For example, the abovementioned sensors can be used to detect malfunctions (e.g., overheating of operating parts, or failure of actuators), which is then also signaled as a fault and which leads to parts of the production device being deactivated or being transferred to a safe state. For this purpose, software routines and other instructions, which examine the input signals of the sensors for implausible or unacceptable statuses, are regularly programmed into the control programs of the programmable logic controller (control device).

The status analysis, performed therewith, of production machines and other parts of the production devices are used with the objective of detecting wear statuses and of optionally also performing preventative maintenance, in order to increase availability. Further objectives are to optimize productivity, monitoring and improvement of product quality and to reduce operating costs and the expenditure on resources (e.g. energy).

The status monitoring that is possible in the programmable logic controllers faces limits for various reasons, for example, owing to the restricted availability of computing time in the programmable logic controllers whose main function is to control a production process, because of the restricted number of sensors that are mainly present only where they are indispensable for controlling the usual operating sequence, and not least owing to the need for the status analysis that is provided in the programmable logic controllers already to be provided for planning the automation arrangement and to be integrated into the control programs.

Owing to these restrictions, external arrangements for status analysis of machines and processes that are intended to detect wear states and, if appropriate, can trigger preventative maintenance and are intended to permit planning of such preventative maintenance have become increasingly more widespread. One of these products is, for example, the system Siplus CMS by Siemens AG. With such status-monitoring devices (also referred to as "CMS"=Condition Monitoring System) it is possible, for example, to monitor the vibration behavior of machine parts, to monitor the backlash of ball roller spindles on the basis of setpoint/actual positions, the backlash of torques and currents of electric car machines in order to detect wear, and to monitor movements and changes therein, for example in the case of machine tools etc.

A characteristic of the methods described above is that the analysis (status monitoring) is based either on variables (in particular sensor values) in the control or the drives, or alternatively used is an external sensor system which frequently determines, measured values for, for example, the temperature, vibration, acceleration, extension or other variables. It is also a characteristic that the sensor system usually has to be planned as part of the automation solution and detects the status of the machine at specific machine elements that are already defined in the engineering stage.

This has the disadvantage that the status analysis and therefore the monitoring of the production devices can usually be performed only to the extent already provided at the time of planning of the industrial automation arrangement. The resulting connection of the status monitoring to the core function of the automation arrangement, specifically the automation of an industrial processor or of industrial production also gives rise to a high level of complexity and a low level of variability. In addition, it is disadvantageous that in the case of a complex, multi-step production only one local condition monitoring process is ever possible, i.e., limited to one controller or the machine controlled therewith or a group of such devices.

SUMMARY OF THE INVENTION

In view of the foregoing, an object of the present invention it is therefore to provide a method and arrangements that improve and simplify the monitoring of the status of a production device.

This and other objects and advantages are achieved in accordance with the invention by a method and an arrangement for monitoring the status of a planning device of an industrial automation arrangement, where the production device is equipped to perform an industrial process or industrial production with a control device with sensors and actuators coupled thereto, and where signals of these sensors are used by the control device to generate status information items about the industrial process or the industrial production. In this context, at least one further sensor is carried through the production device with a product that is being processed by the production device, where further signals are transmitted in a wireless manner to the status-monitoring device by the further sensor, and where the signals and/or the status information items and the further signals are placed at least partially in relationship with one another to generate a status information item about the production device. With this method, it is possible to plan the status monitoring separately from the production device, where it is also possible to combine information items of the industrial control device with the information items and data of a mobile sensor (further sensor) that passes through the production device, with the result that more precise status information items about the status of the production device can be acquired.

A core concept of the inventive solution is that the planning and execution of the machine control is separated from the planning and the design of the status-monitoring device, where sensor data and status information items of the machine control are also available to the status-monitoring device that is then also external, and where in additional mobile sensors, referred to as a bulk material sensor system, is carried along together with a produced material by means of multi-step production, and where the data of this mobile sensor system are correlated with the sensor data and status data of the respective part of the arrangement or production step that has been passed through.

The problem is also solved via the arrangement for monitoring the status of the production device of an industrial automation arrangement, where the production device is equipped with sensors and actuators for implementing an industrial process or industrial production, and where signals of these sensors for generating status information items about the industrial process or the industrial production are provided by the control device. Here, at least one further sensor is carried through the production device or is placed in the vicinity of the production device with a product that is being processed by the production device, where further signals can be transmitted in a wireless manner to the status-monitoring device by the further sensor, and where the signals of the sensors and/or the status information items are at least partially placed in relationship with one another with the further signals of the further sensor and used to generate a status information item about the production device. With this arrangement, it is possible to implement the advantages in conjunction with above-described method in accordance with the invention.

In one advantageous embodiment, the controller or plurality of controllers of the industrial process or of the industrial production is/are connected to one or more status-monitoring devices via a network (data network). As a result, the at least one status-monitoring device can access the signals of the sensors that are linked to the industrial controller or the industrial controllers, and the internal status information items about the industrial process or the industrial production that are present in the one or more control devices.

The further sensor advantageously forms an ad-hoc network with the status-monitoring device or with a radio module of the status-monitoring device as soon as the further sensor enters the radio range of a radio module of the status-monitoring device. It is therefore possible, given the presence of a favorable radio configuration, to read out the further signals of the further sensor without a connection having to be established manually between the further sensor and the network technology or the status-monitoring device.

In one advantageous embodiment, the production device is formed from a multiplicity of production stations, where the further sensor is used, during a pass through the production device, to detect the status of a plurality of production stations. It is therefore also possible to link the signals of the further sensor to the status information items and sensor data of the various production stations, making it possible not only to subject individual stations of the production stations to status monitoring but also to acquire overall information or an overall statement about the entire production device. In this context, it is advantageous if during the pass through the production device the further sensor exchanges the further signals with a multiplicity of radio devices of a single status-monitoring device or with a multiplicity of status-monitoring devices of the industrial production device. In this context, the status monitoring can be executed in a more tightly interwoven manner in chronological and spatial terms, and in addition it is also possible to feed the signals of one and the same sensor to a plurality of status-monitoring devices of an extensive production device. Furthermore, it is possible for individual stations to use their radio devices to pass on signals of the further sensor to other stations and to the status-monitoring devices thereof.

In one particularly advantageous embodiment, a plurality of radio stations in the form of a radio network, which cover a plurality of regions of the industrial production and where each of the radio stations is able to form an ad-hoc network with the further sensor, are coupled to the status-monitoring device.

The further sensor advantageously has a data memory, where a number of values for the respective signal are recorded and subsequently reproduced later. In particular, the data memory is advantageously dimensioned such that the further signals of a complete pass of the sensor through the production device is possible. In particular, for this application it is advantageous if chronological information is acquired by the further sensor during the acquisition of a value for the further signal, and is stored and transferred during the transmission of the further signal or value. Here, pre-processing of the values and signals, particularly filtering or data compression, can also be provided by the further sensor.

In one advantageous embodiment, the acquired status information is used to trigger or plan maintenance of the production device. Further fields of use can be quality assurance, detection of productivity or the utilization rate or other economic purposes.

In another advantageous embodiment, information items are about the interpretation or evaluation of at least some of the further data are stored on the further sensor, where these information items are transmitted to the status-monitoring device and are used by this status-monitoring device to assess the further signals or the data resulting therefrom. It is therefore possible, for example, to influence or program the status monitoring in a situation-conditioned manner through the behavior of a number of differently pre-configured further sensors, such as by predefining different limiting values for the temperature, vibration and other measurement variables as a function of operating requirements, the weather or other influencing factors.

The further sensors are advantageously equipped for autonomous operation, in particular by means of an energy store or via the possibility of taking up energy in a contactless manner ("energy harvesting"), where, for example, solar cells, wireless charging techniques (e.g., according to the PUI standard) and other methods can be used. In one embodiment, in the case of non-use the sensors can automatically deactivate themselves and be "woken up" by an external event, such as by movement (movement sensor, shaking sensor), by a radio signal or by a light pulse. In a further embodiment, it is possible to equip the further sensors for communication with an RFID radio module. Here, the sensor system can be supplied with energy either by a separate energy store or by an electromagnetic alternating field of the radio transmission.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method according to invention is explained below with reference to the drawing. This simultaneously serves to explain an arrangement according to the invention, in which.

DETAILED DESCRIPTION OF THE EXEMPLARY EMBODIMENTS

Figure 1:
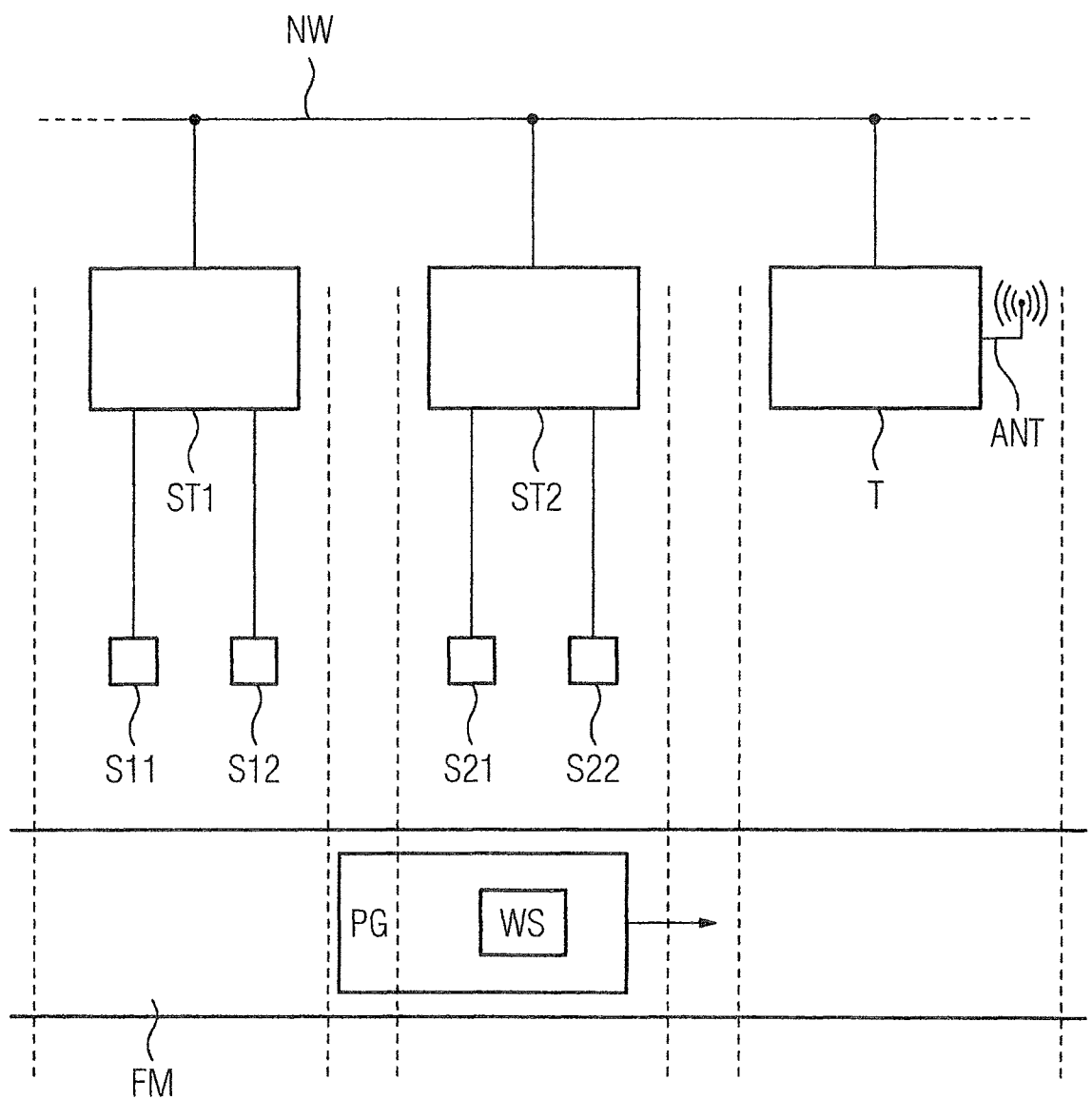
FIG. 1 shows, in a schematic illustration, a production device which is passed through by a production product with a further sensor.

FIG. 1 shows a production device (production line) of an industrial automation arrangement, where the production device has control devices ST1 and ST2 (programmable logic controllers) with sensors S11, . . . , S22 and actuators (not illustrated) connected thereto. The sensors are usually attached to production devices, such as motors, machines, transmissions, pumps, boilers, conveyors, or reactors, which are not illustrated in the figure for reasons of clarity. In this exemplary embodiment, the controllers ST1 and ST2 are associated with different production stations, where a conveyor device FM (e.g., a conveyor line, or a conveyor belt) extends through the production stations, and where a production product PG with a further mobile sensor WS is led through by the conveyor device FM. The controllers ST1, ST2 are connected to a status-monitoring device Z via a network (e.g., a data network, or an automation network). The status-monitoring device Z comprises at least one radio module (not illustrated) with at least one antenna ANT. Such mobile sensors are sometimes also referred to as a "bulk good sensor system", because they can be fed through the arrangements together with the production product PG.

For the sake of simplification, in this exemplary embodiment it is assumed that during the pass through the production device the further sensor WS continuously collects data and stores it together with, in each case, a time stamp and advantageously, if available (e.g., via a GPS module), also a position information item and only moves into radio range of the antenna ANT when the production device is exited, and in the process forms an ad-hoc network with the status-monitoring device Z or a radio module that is linked thereto and in the process transmits the collected data, which should also be referred to below as further signals, to the status-monitoring device Z together with the time information items (time stamps). In other embodiments, a plurality of radio modules with antennas ANT can be distributed over the production device, in order to always read out the further sensor WS in close to real time conditions, as a result of which with this embodiment it is also possible to dispense with a relatively large memory and, if appropriate, also with the time stamping of the further signals (measurement data) of the further sensor WS.

Further signals, i.e., the measured values of the further sensor WS are placed in relationship with, in each case, status information items, sensor data etc. of the controllers ST1, ST2 via the status-monitoring device Z. This means that the data that are present in any case in the controllers ST1, ST2 and which already permit a limited statement to be made about the status of individual production devices and machines are combined with the further additional information that is supplied by the further sensor WS, with the result that a better, more precise statement about the status of the respective production device can be made. It is therefore possible, for example, for the further sensor WS to pick up acceleration data about the dynamics of the conveyor device FM. These data are placed in relationship, for example, with an information item about the mass (weight) of the production product PG which is transported with the conveyor means FM. A realistic statement about the status of the drive technology of the conveyor device FM, i.e., for example, torque or power, can only be made via knowledge of the dynamics (acceleration) and the mass of the moved production product PG.

In the following section, it is to be assumed that the illustrated production device is a packaging arrangement in which a liquid (e.g., beverage, or medicine) is filled. In this context, the production product PG passes through various machine modules and therefore also production stations, such as for cleaning a bottle, for filling, for sealing, for labelling and finally for packaging in film or in a carton. The conveyor device FM, i.e., machines for transporting material (e.g., conveyor belts, conveyor worms, or handling arrangements), storage arrangements, or buffers are located between the individual production stations and machine modules. Instead of usually providing the machine primarily or exclusively with the sensor system (sensors S11, . . . , S22) as part of the automation technology, as is traditional in machine construction, now an additional sensor system (further sensor WS) on or, if appropriate even in, a bottle (i.e., the product) is fed into the production process. In this context, either conventional bottles can be provided with an additional sensor system, or it is also possible to use what are referred to as "dummy bottles" that correspond in shape and size to a conventional bottle but do not accommodate any useful content and instead comprise electronics with a sensor system, radio modules, or storage device.

Consequently, with a pass of this bottle, which is equipped with a sensor system, status information items of all the involved machine elements are detected and also the influence of the corresponding statuses on the product (e.g., quality, or fabrication times) is detected. In this context, parameters, such as temperature, shock, or illumination situation, can be detected as the status information. The assignment to individual machines, machine elements, or production stations can be made via the resolution of the position, which is in turn determined either directly as position information (for example, via a GPS sensor) or otherwise via correlation of the time stamp of a measured value with the time stamp of a tracking information item that is detected on the part of the production device or the controllers ST1, ST2 during the processing of the production product PG with the further sensor WS. In the latter case, it is possible, for example, to provide a respective production product PG with an identification information item, such as an RFID label, or a barcode, where the production product PG is automatically identified at each processing station, at each machine or each production station. As a result, a correlation of the further signals (measured values) of the further sensor WS with the status information items (internal status information items, measured values of the sensors S11, . . . , S22 etc.) can be effected via the status-monitoring device Z.

A further example of a further sensor can be in the field of printing technology, where a sensor on the printing web of paper can serve to detect extension, stress, pressure of the printing roller, temperature, or vibrations. In particular, in conjunction with the time stamps of the further signals (sensor values) and the determining of location or assignment of the measured values to individual machines and therefore production machines, which is possible therewith, it is possible to determine the location of critical points in the production pass when a paper web or the like is printed.

Through the correlation of the measured values of the further sensor WS with the data and status information items that are present in any case in the production means it is possible to generate maintenance information. On the one hand, transgressions of limiting values or other striking features can already identify defective machine parts or production devices and therefore indicate a fault or trigger immediate maintenance. On the other hand, it is possible to carry out predicted maintenance via the combination of the various data and information items, in order, for example, to detect creeping changes to production devices and therefore preventatively plan and perform maintenance.

It is also possible to store limiting values or evaluation algorithms or instructions for evaluating the measurement results with the further sensor or in a readable electronic memory of further sensors WS. These further information items comprise, in particular, algorithms or methods of the KI (neural networks or rule-based knowledge representation) that are therefore also supplied by the further sensor WS or at least parameterized thereby. In a further embodiment, the information items that are made available by the sensor can also be used to parameterize the respective local control device, such as to adapt controllers.

It is possible, for example, in automobile construction, to connect a further sensor to a body shell, where the body shell passes through a painting station, for example. With the recording of the further sensor WS, it is possible to verify later how long and at what temperature the body shell has been pre-heated before the painting process, how long the painting process has lasted and for how long and with which temperature profile the paint was dried. In this context, linking with internal data of the production device makes it possible for the status-monitoring device Z to compare the set point values at the drying temperatures and pre-heating temperatures with the actual values which are reached. Furthermore, it is, however, also possible to keep further sensors ready that have been differently pre-programmed and have differently set limiting values, where by selecting a correspondingly pre-programmed further sensor the measurement results can then be interpreted differently. It is therefore possible, for the example of the painting line in automobile construction, to allow for the fact that relatively large or relatively complex vehicle bodies only heat or cool down again more slowly than relatively small units, with the result that the heating times and cooling times that are reached have to be evaluated differently. By selecting a further mobile sensor WS with a respectively adapted limiting value for the tolerance or the permitted or requested times for the heating or cooling of the vehicle bodies, it is then possible to allow for this fact, with the result that a malfunction cannot be incorrectly assumed.

Basically, conventional methods for status-monitoring are expanded by methods for status analysis of machines and products based on a distributed mobile and low-cost sensor system ("bulk material sensor system") which has been networked in an ad-hoc manner. A distributed, mobile and low-cost sensor system that has been networked in an ad-hoc manner is characterized by sensors that are preferably carried along on the workpiece or in the process and are not in use in a stationary manner on the production machine. The use of a very large number of sensors and measuring points is typical, and therefore AI methods (e.g., pattern recognition/deep learning/neural networks) can be used for processing. The sensor system is advantageously a robust sensor system (also encapsulated in IPxx) and a multifunctional sensor system (i.e., for temperature, position, light, vibration, acceleration . . . ). The multi-functionality permits universal use, and therefore very high production numbers and thus low costs per unit produced are possible. For the purpose of communication wireless ad-hoc communication (e.g., Bluetooth, RFID technology, ZigBee) is suitable, particularly in conjunction with an autonomous energy supply. A time/position stamp is advantageously linked to the signals. A correlation of the signals with the variables and signals of the automation technology is essential.

Figure 2:
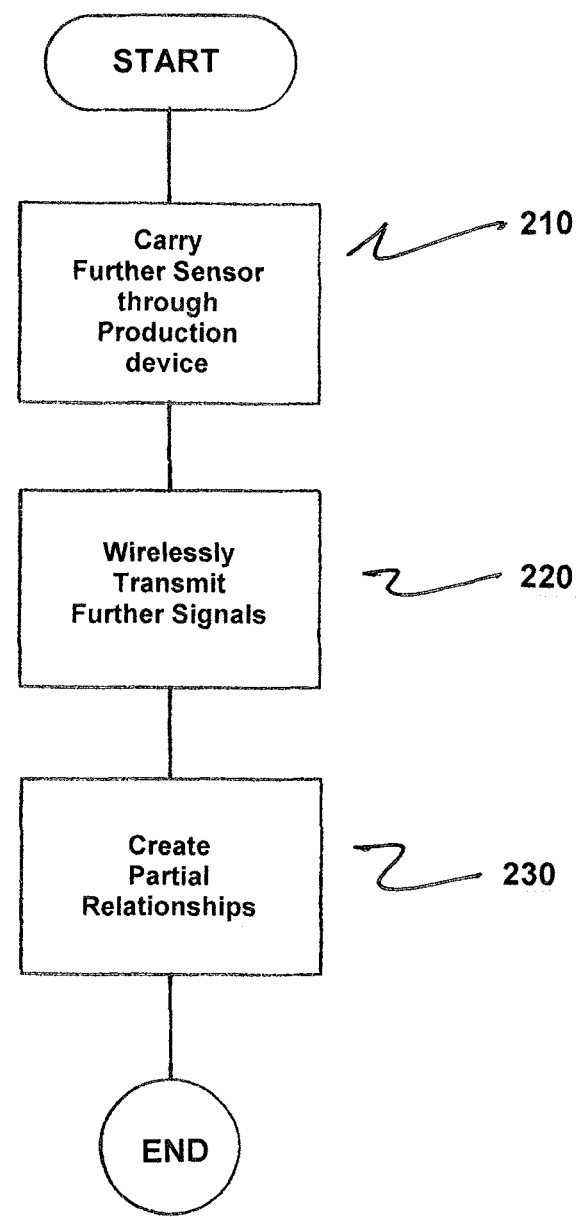
FIG. 2 is a flowchart of the method in accordance with the invention.

FIG. 2 is a flowchart of a method for monitoring status of a production device of an industrial automation arrangement, where the production device is configured to implement an industrial process or industrial production with a control device ST1, ST2 with sensors S11, . . . , S22 and actuators coupled thereto, and wherein signals of these sensors S11, . . . , S22 are utilized by the control device ST1, ST2 to generate status information items about the industrial process or the industrial production. The method comprises carrying at least one further sensor through the production device with a product PG which is being processed by the production device, as indicated in step 210.

Next, further signals are wirelessly transmitted to the status-monitoring device Z by the further sensor WS, as indicated in step 220.

Next, at least one of (i) the signals and (ii) the status information items and the further signals are placed at least partially in relationship with one another to generate a status information item about the production device, as indicated in step 230.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for monitoring status of a production line of an industrial automation arrangement, the production line being configured to implement an industrial manufacturing process with a programmable logic controller (PLC) having sensors and actuators directly coupled thereto, and signals of said sensors comprising measured temperature or acceleration values of the sensors being utilized by the PLC to generate status information items about the industrial manufacturing process, the method comprising:

carrying at least one further sensor including evaluation algorithms comprising a neural network for evaluating measurement results through the production line which implements the industrial manufacturing process with a product which is being processed by the production line which implements the industrial manufacturing process;

transmitting further signals comprising measured temperature or acceleration values of the further sensor wirelessly to a status-monitoring device by the further sensor, the measurement results comprising the temperature or acceleration values; and placing at least one of (i) the signals of the sensors coupled to the PLC and (ii) the status information items from the PLC and the further signals comprising the measured temperature or acceleration values of the further sensor at least partially in relationship with one another to generate a status information item about the production device which implements the industrial manufacturing process.

2. The method as claimed in patent claim 1, wherein the status-monitoring device accesses internal data of the PLC of the production line.

3. The method as claimed in patent claim 2, wherein the status-monitoring device accesses signals of at least one of (i) the sensors and (ii) the status information items about the industrial manufacturing process via a network or a data interface.

4. The method as claimed in patent claim 1, wherein the further sensor forms an ad-hoc network with the status-monitoring device as soon as the further sensor enters radio range of a radio module of the status-monitoring device.

5. The method as claimed in patent claim 1, wherein the production line is formed from a multiplicity of production stations; and wherein the further sensor is utilized to detect the status of a plurality of production stations during a pass through the production line.

6. The method as claimed in patent claim 5, wherein during the pass through the production line the further sensor exchanges the further signals with one of (i) a multiplicity of radio devices of a single status-monitoring device and (ii) a multiplicity of status-monitoring devices of the production line.

7. The method as claimed in patent claim 1, wherein the further sensor includes a data memory; and wherein a number of values for respective signals are recorded and reproduced subsequently.

8. The method as claimed in patent claim 1, wherein at least one of (i) chronological information and (ii) position information is acquired by the further sensor during the acquisition of a value for the further signal comprising the measured values of the further sensor, one of the (i) chronological information and (ii) position information being stored and transferred during transmission of the further signals.

9. The method as claimed in claim 1, wherein the status information is utilized to trigger or plan maintenance of the production line.

10. The method as claimed in claim 1, wherein information items for interpreting or evaluating at least some of the further data are stored on the further sensor for interpreting or evaluating at least some of the further data; and wherein these information items are transmitted to the status-monitoring device and are utilized by this status-monitoring device to assess the further signals.

11. The method as claimed in claim 10, wherein the information items comprise at least one of (i) algorithms and (ii) parameters.

12. An arrangement for monitoring status of a production line of an industrial automation arrangement, the production line being equipped with a programmable logic controller (PLC) having sensors and actuators directly coupled thereto for implementing an industrial manufacturing process, and signals of said sensors comprising measured temperature or acceleration values of the sensors being utilized by the PLC to generate status information items about the industrial manufacturing process, the arrangement comprising:

at least one further sensor including evaluation algorithms comprising a neural network for evaluating measurement results, said further sensor being carried through the production line which implements the industrial manufacturing process or which is placed in a vicinity of the production line with a product which is being processed by the production line which implements the industrial manufacturing process, further signals comprising measured temperature or acceleration values of the at least one further sensor being transmittable in a wireless manner to a status-monitoring device by the further sensor, the measurement results comprising the temperature or acceleration values;

wherein at least one of (i) signals of the sensors coupled to the PLC and (ii) the status information items from the PLC are at least partially placed in relationship with one another with the further signals comprising the measured temperature or acceleration values of the further sensor and utilized to generate a status information item about the production line which implements the industrial manufacturing process.

13. The arrangement as claimed in patent claim 12, wherein the status-monitoring device is integrated as a separate functional module into the PLC of the production line.

14. The arrangement as claimed in patent claim 12, wherein the further sensors are equipped for autonomous operation via an energy store.

15. The arrangement as claimed in patent claim 13, wherein the further sensors are equipped for autonomous operation via an energy store.

16. The arrangement as claimed in patent claim 12, wherein the further sensor is configured to form an ad-hoc network with a radio device of the status-monitoring device.

17. The arrangement as claimed in patent claim 13, wherein the further sensor is configured to form an ad-hoc network with a radio device of the status-monitoring device.

18. The arrangement as claimed in patent claim 14, wherein the further sensor is configured to form an ad-hoc network with a radio device of the status-monitoring device.

* * * * *